United States Patent [19]
Finn et al.

[11] Patent Number: 5,961,345
[45] Date of Patent: Oct. 5, 1999

[54] FACEPLATE SYSTEM

[75] Inventors: John Finn, Derry; Michael Joseph, Nashua, both of N.H.; Norman J. Wainio, Milford; Michael Romm, Brighton, both of Mass.

[73] Assignee: Cabletron Systems, Inc., Rochester, N.H.

[21] Appl. No.: 09/006,848

[22] Filed: Jan. 14, 1998

[51] Int. Cl.[6] .................................................. H01R 13/74
[52] U.S. Cl. ............................................................ 439/536
[58] Field of Search ................................... 439/536, 537, 439/532

[56] References Cited

U.S. PATENT DOCUMENTS

| | | | |
|---|---|---|---|
| 4,875,880 | 10/1989 | Welch et al. | 439/536 |
| 5,452,175 | 9/1995 | Tsai | 439/536 |
| 5,460,541 | 10/1995 | Weatherley | 439/532 |

*Primary Examiner*—Gary Paumen
*Attorney, Agent, or Firm*—Wolf, Greenfield & Sacks, P.C.

[57] ABSTRACT

A faceplate system that removably mounts interchangeable connector mounting inserts. The system uses a faceplate frame having mounting rails with access notches and rectangular connector mounting inserts that have corner legs and spacer walls at their ends. The legs have ledge surfaces slidingly engage the under sides of the mounting rails, and the spacer walls slidingly engage the upper sides of the mounting rails. The legs gain access to the under sides of the rails through the rail notches.

1 Claim, 5 Drawing Sheets

FACEPLATE SYSTEM

BACKGROUND OF THE INVENTION

The invention relates to a faceplate system and more particularly to an improved faceplate system that employs removably mounted inserts.

Faceplates are used to support a variety of electrical components. Some of the conventional electrical components supported by faceplates are telephone plugs, electrical connectors, light switches, and electrical switches. Moreover, faceplates find use in more complex interconnects, such as complex office interconnect systems using computers. These complex systems include a variety of interconnects at many locations that are typically supported by faceplates. And various faceplate configurations are required to support the electrical elements in different configurations.

In view of the many configurations of electrical components, it is no longer practical to provide a different faceplate for each possible configuration of electrical component.

There have been efforts to provide configurable faceplates with removably mounted and interchangeable modules or inserts. One approach uses mounting hardware, such as screws, nuts, and clamps. An example of such an approach is AXESS™ receptacle housing faceplate products. Another approach uses snap-in tabs on inserts or on the connectors themselves. An example of such an approach is the MOD-TAP™ Universal System Outlet wall plate system. Yet another approach uses tabs on the faceplate. An example of such an approach is MOD-COM™ Executive Series faceplates.

The above mentioned approaches have drawbacks. For example, the snap-in approaches require (for insert or module removal) small unsightly visible openings in the face of the faceplate between inserts or modules. And removable of the snap-in inserts or modules requires a tool to be inserted in the openings to pry a insert or module for removal. Then too, a snap-in can be inadvertently pushed or pulled out. Pulling out a snap-in member can occur with front access faceplates by pulling a cable too hard; pushing out a snap-in member can occur with rear access faceplates by pushing a cable too hard.

There is a need for a configurable faceplate that provides a stable mounting for inserts and that provides an improved appearance.

SUMMARY OF THE INVENTION

An object of the invention is an improved faceplate that interchanges inserts or modules with different types of media connectors.

Another object of the invention is a faceplate that provides a stable mounting for inserts on a faceplate frame and that provides easy mounting of inserts.

Yet another object of the invention is a configurable faceplate having an improved appearance.

These and other objects are attained by a modular faceplate that holds inserts in fixed mounted position on mounting rails. A faceplate according to the invention includes a faceplate frame. The frame includes a pair of opposed spaced apart parallel elongated side portions and a pair of opposed spaced apart parallel elongated end portions extending between the elongated side portions in a direction normal thereto. Each of the elongated side and end portions have a front, back, and inner surfaces. The front and inner surfaces intersect normal to each other with each of the inner surfaces extending from its intersection with its respective front surface in a direction toward the back surface of the faceplate. Moreover, each of the end regions of one of the elongated end portions are joined to an end region of one of the elongated side portions, and each of the end regions of the other of the elongated end portions are joined to the opposite end region of one of the elongated side portions. Accordingly, the inner surfaces of the elongated side and end portions defines a rectangular opening therebetween. The faceplate frame further includes a mounting rail on each of the inner surfaces of the elongated side portions intermediate the front and back surfaces. Each of the mounting rails has a front surface facing the front of the faceplate and a back surface facing the back of the faceplate. Further, the rails are shaped to include a spaced apart pair of notches therethrough providing access to the back surface of its respective mounting rail.

In accordance with the invention, the faceplate further includes a mounting insert or module removably mounted on the faceplate frame in the rectangular opening. The insert includes a rectangular plate extending across the width of the rectangular opening of the faceplate frame. The plate itself has an opening therethrough for accepting a media connector and has a front surface in coplanar relationship with the front surfaces of the elongated side and end portions. The mounting insert further includes a leg at each of the corner regions of the plate and a spacer wall at each end of the plate between the legs. Each of such spacer walls has its outer surface flush with its end edge surface of the plate and extends away from the plate in a direction normal thereto to terminate in sliding engagement with the front surface of its associated mounting rail. Each of the legs is located on the underside of the plate with its outwardly facing surface in the same plane as the rear side of its associated spacer wall and includes a ledge surface at its free end region extending from its outwardly facing surface to be in sliding engagement with the back surface of its associated mounting rail. The pair of notches in the mounting rails are spaced apart the same distance as the distance between the pair of legs at each end of the plate. The ledge surfaces of the legs are dimensioned to allow movement of the ledge surfaces through the notches and into sliding engagement with the back surface of the rails during mounting of the plate on the faceplate frame.

A stop surface on the faceplate frame is in abutting relationship with one lengthwise edge of the plate with: each of the legs of the plate being in adjacent relationship to and on one side of its respective notch; and the ledge surface of the legs and the spacer walls being in sliding engagement with the front and back rail surfaces respectfully.

a bezel stop is removably mounted on the faceplate in abutting relationship with the other lengthwise edge of the plate in a location to stop to keep the insert in fixed mounted position on the faceplate frame.

The invention allows easy mounting and removal of a faceplate insert or module from a faceplate frame. One merely moves an insert into the faceplate opening to move the legs of the insert into the mounting rail notches and brings the spacer walls into sliding engagement with the front surfaces of the mounting walls. The insert is then moved on the mounting rails to bring the ledge surfaces of the insert legs to one side of the notches into sliding engagement with the back surfaces of the mounting rails and to bring the insert into abutting relationship with a stop surface. The stop surface is positioned to keep the insert captured on the mounting rails between the ledge surfaces of the legs and engaging surfaces of the spacer walls with the ledge surfaces to one side of their respective mounting rail notches. The position of the insert is fixed by mounting a locking bezel into abutting relationship with the insert.

One can easily remove a faceplate insert. This can be accomplishes by removing the locking bezel and moving the insert legs along the mounting rails into the notches. In this position one can lift the insert from the faceplate opening.

Other objects and advantages of the invention will become apparent as the invention is hereinafter described in more detail with reference made to the following drawings.

DESCRIPTION OF THE PREFERRED EMBODIMENTS

Figure 1:
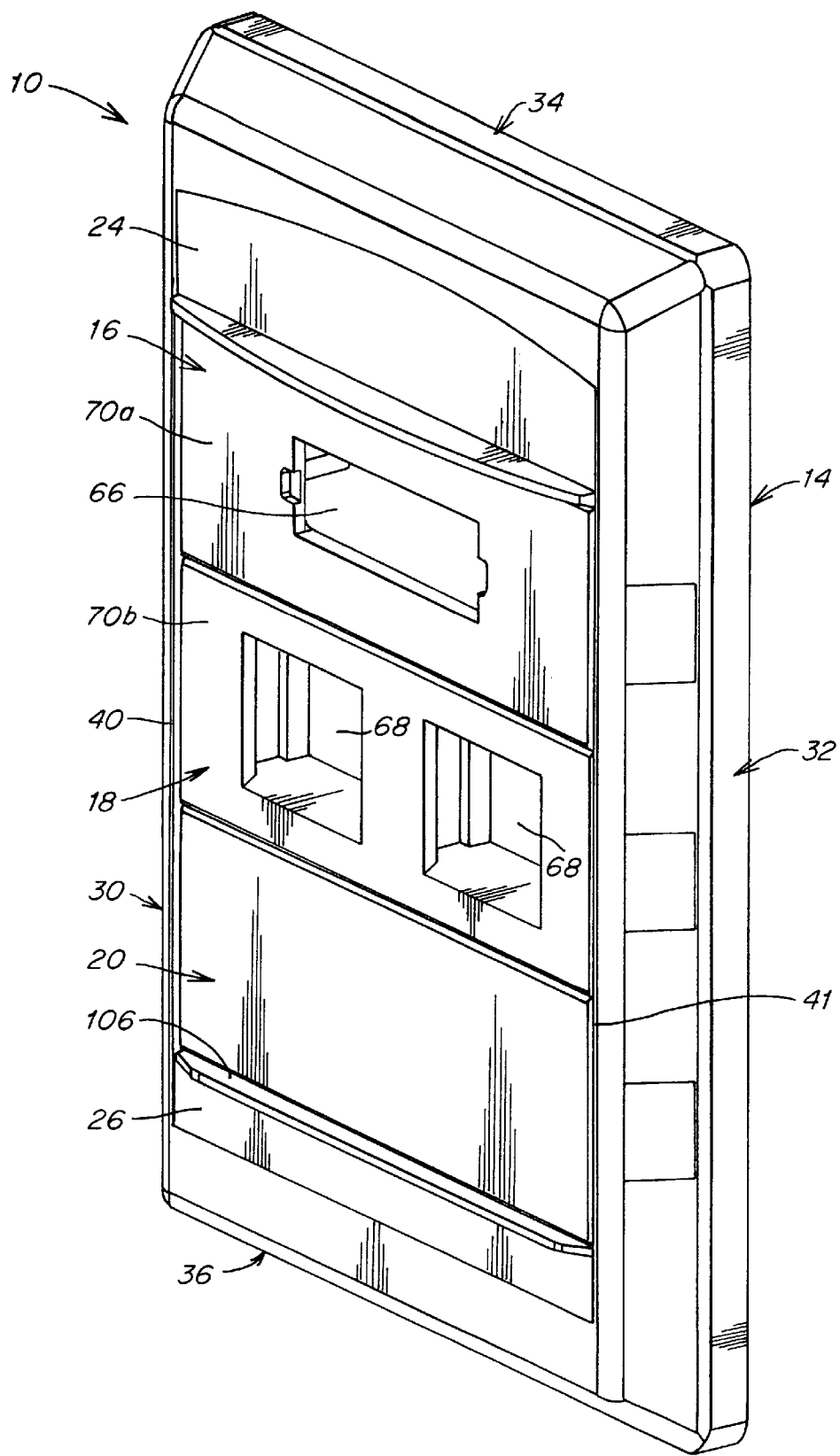
FIG. 1 is a front perspective view of a configurable faceplate according to the principles of the invention that includes three connector mounting inserts. One of the inserts is shown as a blank.

FIGS. 1–4 illustrate a rectangular faceplate 10 according to the principles of the invention. As shown, the faceplate 10 includes a faceplate frame 14, inserts or modules 16, 18, and 20, a snap-in locking bezel 24, and a snap-in cover 26.

The faceplate frame 14 is conveniently rigid plastic and is shaped like a picture frame. In this regard, the frame 14 includes opposed spaced apart parallel elongated side portions 30 and 32 and opposed spaced apart parallel elongated end portions 34 and 36 extending between the side portions 30 and 32. The end portions 34 and 36 are in perpendicular relationship with the side portions 30 and 32. Further, the side portions 30 and 32 include front surfaces 40 and 41, back surfaces 42 and 43, and inner surfaces 44 and 45 respectfully. The end portions 34 and 36 include front surfaces 46 and 47, back surfaces 48 and 49 ,and inner surfaces 50 and 51 respectfully.

The inner surfaces 44, 45, 50, and 51 extend from their intersection with their respective front surfaces 40, 41, 46, and 47 toward the back surfaces 42, 43, 48, and 49 to define a rectangular opening 54. The opening 54 is shown partially unfilled in FIGS. 2 and 3 as a result of the explode position of insert 16 in FIGS. 2 and 3.

The faceplate frame 14 further includes a mounting rail 56 on each of the inner walls 44 and 45 of the elongated sidewall portions 30 and 32. The mounting rails 56 are spaced in recessed relationship with the front surfaces 40, 41, 46, and 47. The mounting rails 56 have pairs of spaced a access notches 58. As shown in the figures, each of the rails 56 has three pairs of notches 58—one pair on each of the rails 56 for each of the inserts 16, 18, and 20.

The faceplate 10 is illustrated with three inserts 16, 18, and 20 removably mounted on the frame 14 in the rectangular opening 54. But a faceplate according to the invention can be constructed with dimensions to use more or less than three inserts. As illustrated, the front surfaces of the inserts 16, 18, and 20 are coplanar with the front surfaces 40 and 41 of the faceplate 10.

As shown, each of the inserts 16, 18, and 20 is identical except its media connector opening configuration. The topmost insert 16 has a connector opening 66 configured to accept an SC optical fiber connector. The middle insert 18 has two identical openings 68 configured to accept standard keystone connectors. The bottom insert 20 is blank. And, of course, other connector openings are contemplated and used for other types of connectors, for exampleco-axial, twisted pair, and the like.

Each of the inserts includes a rectangular plate 70 that extends across the width of the rectangular opening 54. The inserts are identical except for their media connector openings (i.e., openings 66 and 68) or lack thereof. As shown, insert 16 includes a plate 70a; insert 18, plate 70b; and insert 20, plate 70c. Plate 70c is blank.

Each of the inserts 16, 18, and 20 includes four legs 74, one leg at each of the corner regions of its respective plate 70. In the FIGS. each of the legs 70 is identical. Insert 16 is shown with legs 74a; insert 18, with legs 74b; and insert 20, with legs 74c. The endwise distance between the legs 70 is the same as the distance between pairs of notches 58 on the rails 56.

Each of the legs has a ledge surface 76 facing toward the underside of its respective plate 70, as shown in the FIGS. The ledges 76 are of such a size and position to engage the back surface of their respective mounting rail 56 in sliding relationship when the inserts are in mounted position on the faceplate frame 14. As shown more clearly in the FIGS. 3 and 4, the ledge surfaces 76 are located to one side of the notches 58 in the mounting rails 56 and are in sliding engagement therewith.

Further, each of the inserts 16, 18, and 20 includes a spacer wall 78 located at each end of the each of the plates 70 between the legs 74. The spacer walls 78 are shown extending at right angles from the their respective plates 70 on the same side thereof as the legs 74. Insert 16 is shown with spacer walls 78a; insert 18, with spacer wall 78b; and insert 20, with spacer walls 78c. Each of the outwardly facing surfaces of the walls 78 is flush or coextensive with the end edge surface of its respective plate 70. And the ledge surfaces 76 are shown to extend to terminate in a plane coextensive with the outer surfaces of the spacer walls 78.

The distance between the free ends of the spacer walls 78 and the ledge surfaces 76 is the thickness of the rails 56. Consequently, the ledge surfaces 76 and the end surfaces of the spacer walls 78 slidingly engage the back surfaces and front surfaces respectively of the mounting rails 56 when an insert is in mounted position on the rails 56. The insert is, therefore, secure on the mounting rails 56.

As illustrated in the FIGURES, the inserts 16, 18, and 20 are in abutting relationship with each other along their lengthwise edges when they are in mounted position on the faceplate frame 14. The lowermost insert 20 insert is in lengthwise butting relationship with the inner surface of the lower end portion 36. Therefore, the inner surface of the lower portion 36 acts as a stop surface. The upper lengthwise edges (as viewed in the FIGURES) of inserts 18 and 20 also function as stop surfaces for insert 16 and 18 respectively.

When the locking bezel 24 is snapped-in place, it is in butting relationship with the insert 16. Consequently, all the inserts are kept in fixed location between the mounted locking bezel 24 and the inner surface of the lower end portion 36.

One can easily mount inserts 16, 18, and 20 on the faceplate frame 14. A person merely needs to move an insert into the rectangular opening 54 of the frame 14 and position its legs 74 into notches 58 of the mounting rails 56. With both the ledge surfaces 76 and the spacer walls 78 aligned for slide fit relationship on opposite sides of the rails 56, the insert is moved downwardly (as viewed in the figures) to place the lower edge of the insert in butting relationship with a stop surface and the legs 74 to one side of their respective notches 58. The process is repeated for the next insert. Mounting is completed by snapping the locking bezel 24 in place.

One can easily remove the inserts 16, 18, and 20. This is accomplished by removing the locking bezel 24 and moving the insert upwardly along the mounting rails (as viewed in the figures) to locate the legs 76 in the notches 58. The insert can be lifted from the faceplate opening 54.

The faceplate 10 can be fasted to a wall by screws or the like (not shown) using fastening openings 82 and 84 on the frame 14. And as can be seen more clearly in the FIG. 1, the locking bezel 24 covers the fastening opening 82 when mounted. The cover 26 covers the fastening opening 84 when mounted.

Figure 2:
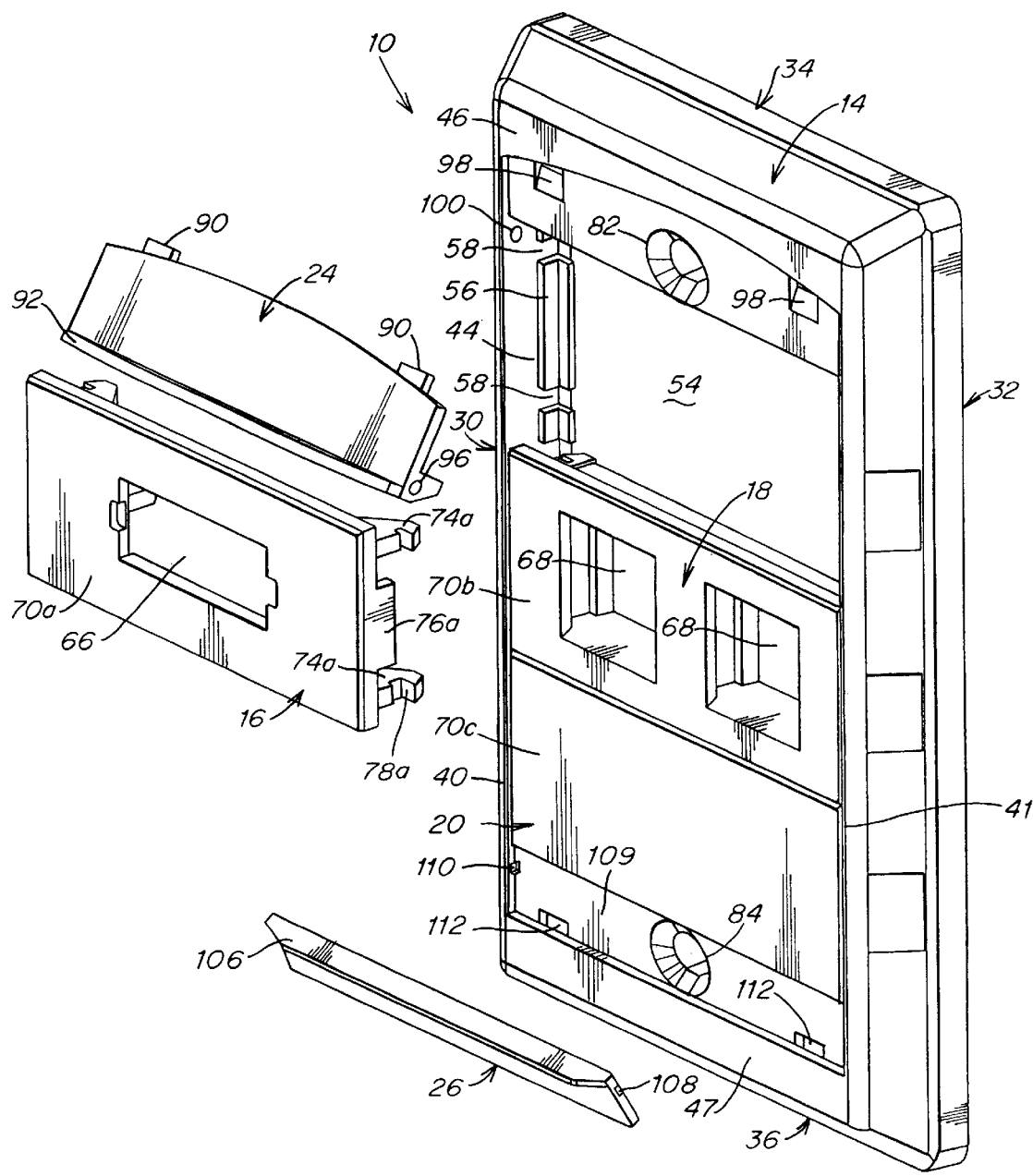
FIG. 2 is a partially exploded front perspective view of the faceplate of FIG. 1. The faceplate is shown with the uppermost insert and with a snap-in locking bezel separated from its mounted location on the faceplate frame. A snap-in lower cover is also shown separated from its mounted location on the faceplate frame.
Figure 3:
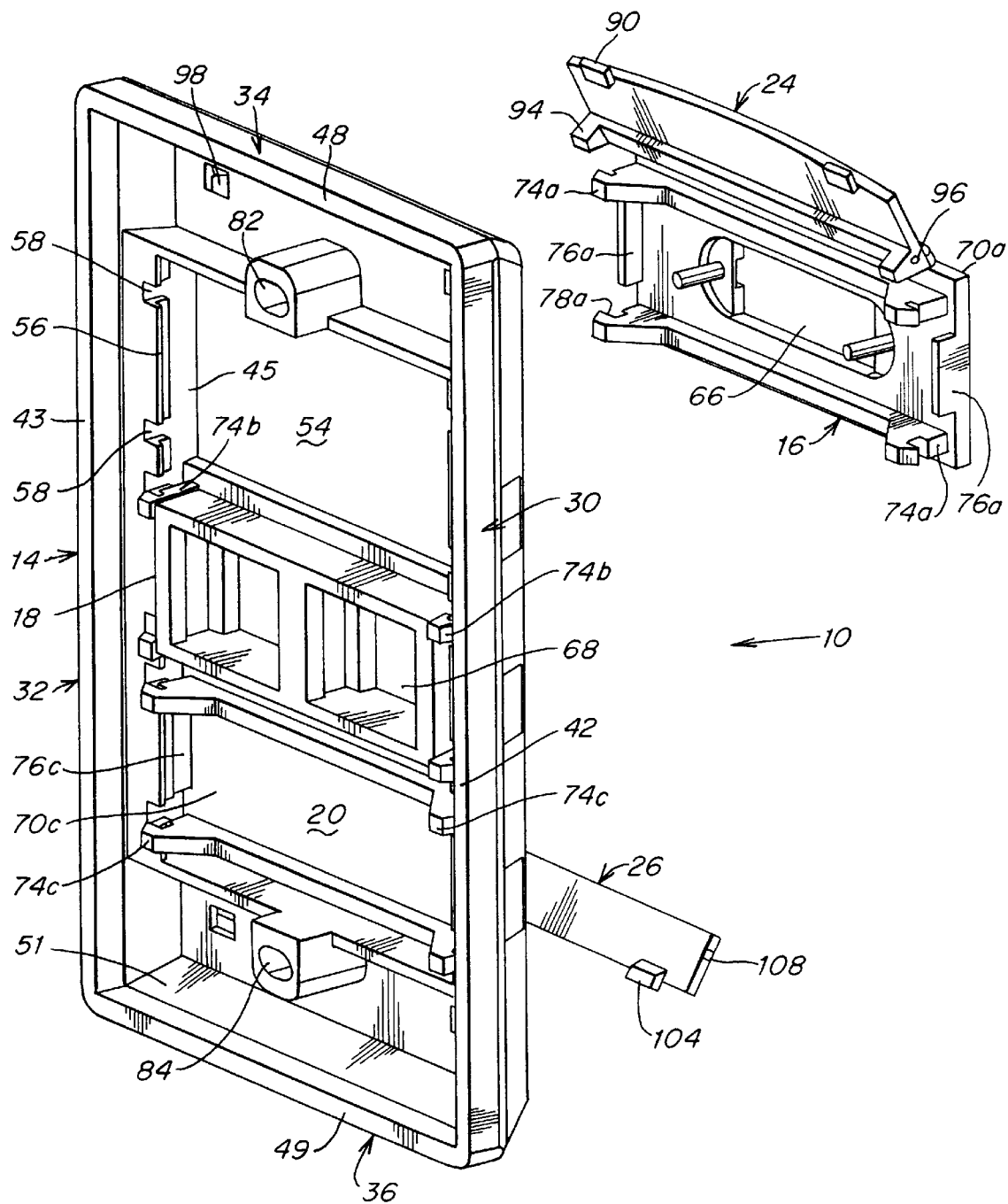
FIG. 3 is a partially exploded rear perspective view of the faceplate of FIG. 1. As with FIG. 2, the uppermost insert, locking bezel, and lower cover are shown separated from their mounted locations on the faceplate frame.
Figure 4:
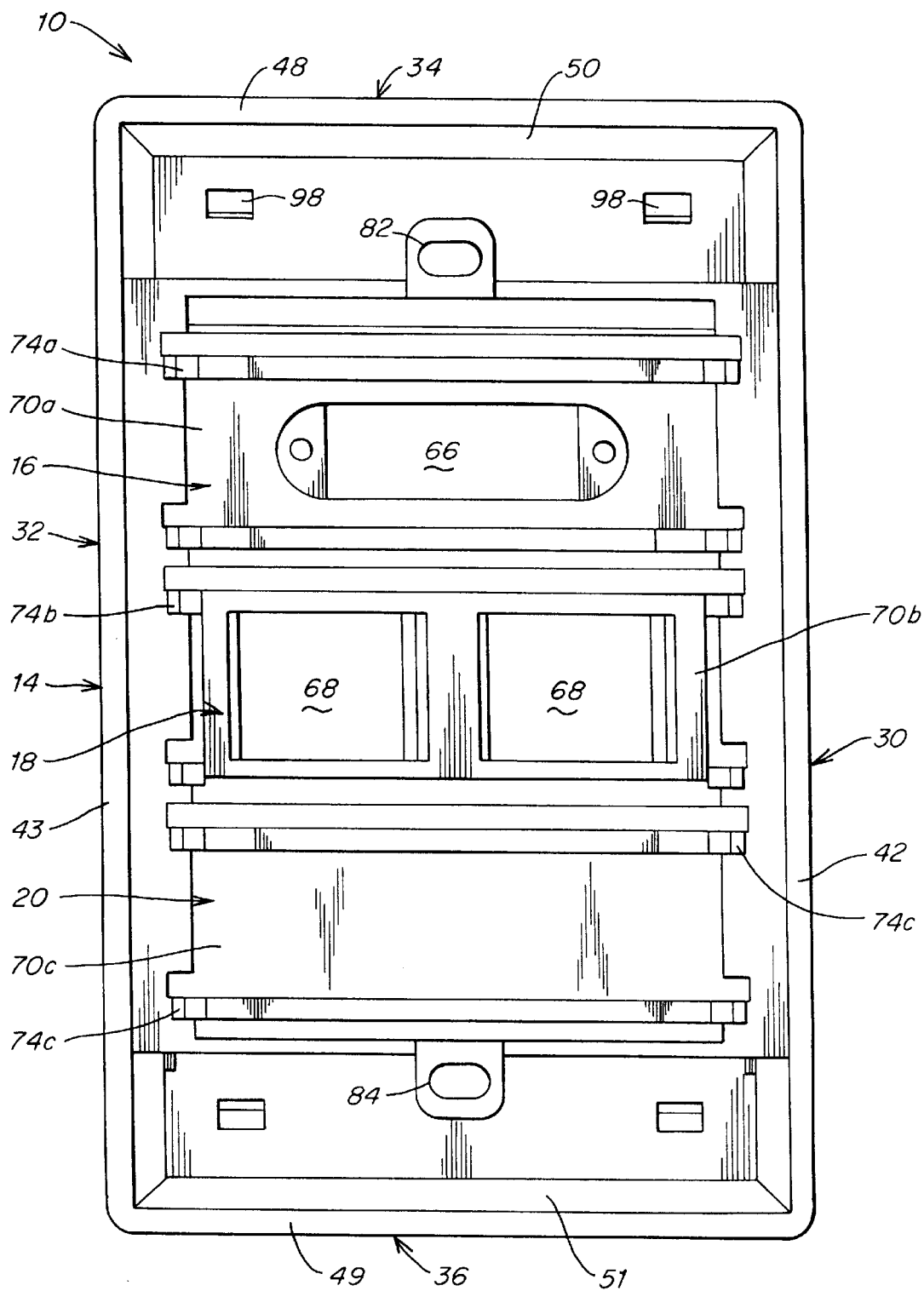
FIG. 4 is a rear elevation view of the faceplate of FIG. 1. All the inserts, the locking bezel and the lower cover are shown mounted on the faceplate frame.

Referring more particularly to FIGS. 2 and 3, it can be seen that the locking bezel 24 includes tabs 90 at one lengthwise side, an outwardly facing ledge 92 at the other lengthwise side, inwardly facing spacer legs 94 at the other lengthwise side, and detentes 96. The frame 14 includes openings 98 and detente recesses 100 (see FIG. 2) on the inner surfaces 44 and 45.

The locking bezel 24 is mounted in position on the frame 14 by placing the tabs 90 in the openings 98 and moving the lower portion of the bezel 24 to bring the detentes 96 into snap-in relationship with the detente recesses 100. In such position the spacer legs engage the upper or font surfaces of the mounting rails 56 in abutting relationship. The ledge 92 is used in removal of the bezel 24 from the frame 14.

Still referring more particularly to FIGS. 2 and 3, it can be seen that the cover 26 includes tabs 104 at its lower side (as viewed in FIGS. 2 and 3), an outwardly facing ledge 106, detentes 108 at the ends of the cover 26. The frame 14 includes a recess 109, detente recesses 110, and mounting openings 112.

The cover 26 is mounted by placing the tabs 104 in the openings 112 and moving the detentes 108 into snap-in relationship with the detente recesses 110. When mounted, the cover 26 rests on the floor of the recess 109. And, as illustrated, the outwardly facing surface of the cover 26 is flush with the other front surfaces of the frame 14.

Figure 5:
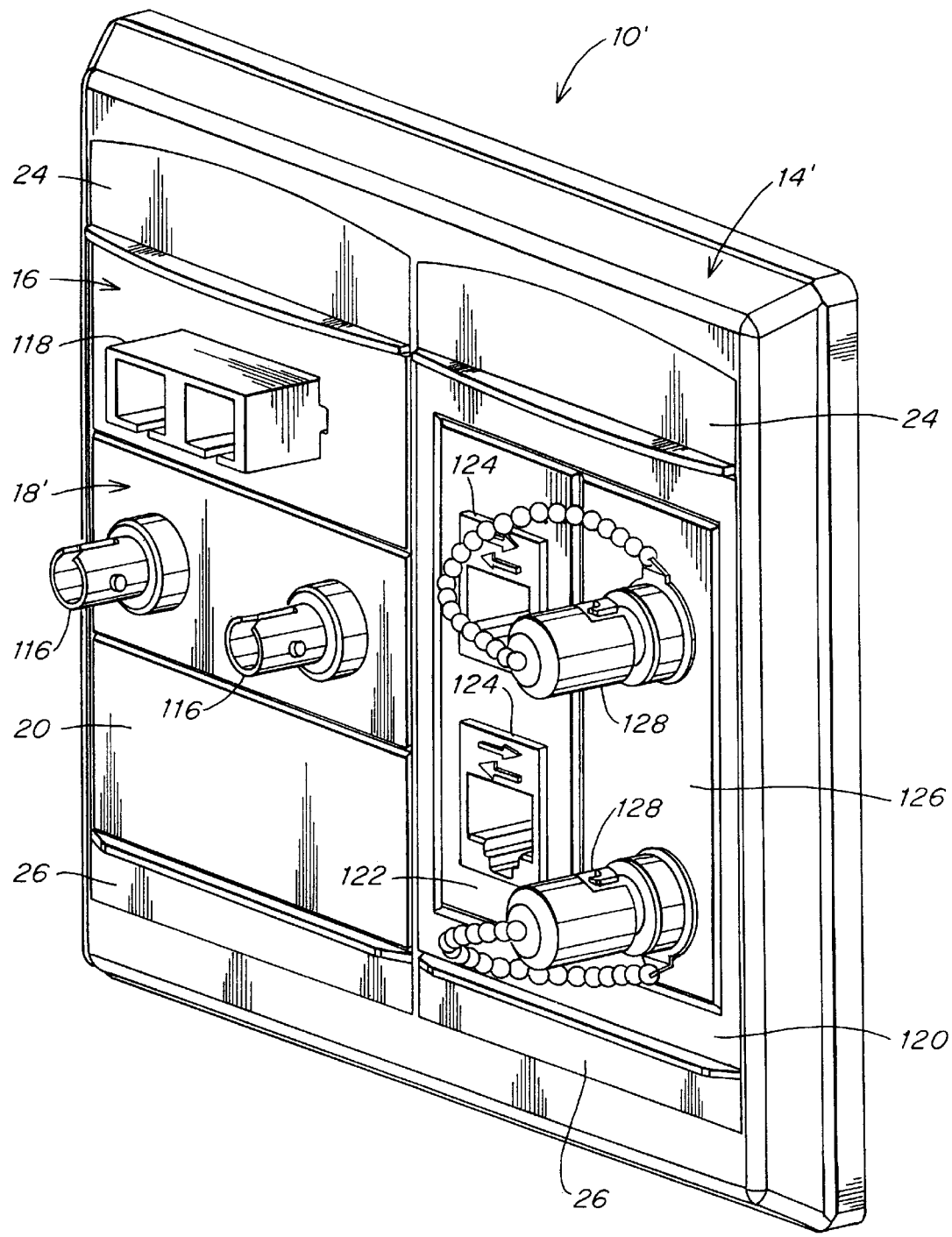
FIG. 5 is a front perspective view of an alternative embodiment of a faceplate according to the principles of the invention. The faceplate illustrated in FIG. 5 is a dual faceplate.

FIG. 5 shows an alternative faceplate according to the principles of the invention. Illustrated is a dual faceplate 10'. As shown, the left side of faceplate 10' is the same is the faceplate 10, except for the middle insert 18'. The faceplate 10 shown in FIGS. 1–4 includes a middle insert 18 that has two keystone connector openings 68. The faceplate 10' includes a middle insert 18' that has two connector openings for ST fiber optic connectors. FIG. 5 shows anST fiber optic connector 116 (without its cap) mounted in each of the connector openings of insert 18'. Moreover, the opening 66 in insert 16 is shown in FIG. 5 with an SC fiber optic connector 118 mounted therein.

The right side of the dual faceplate 10' includes an insert 120 that holds patch panels 122 and 126. The insert 120, which is shown configured like a picture frame, is mounted on the faceplate frame 14' in the same manner as discussed in connection with the mounting of the inserts 16, 18, and 20 on the faceplate frame 14. The patch panels 122 and 126 are snapped-in the opening of the insert 120 in a conventional manner. The patch panel 122 is shown with data connectors 124 mounted in its two connector openings. The patch panel 126 is shown with ST fiber optic connectors 128 (with their covers) mounted in a conventional manner in its two connector openings.

It is apparent that within the scope of the invention modifications and different arrangements may be made other than herein disclosed. The present disclosure is merely illustrative, and the invention comprehends all variations thereof.

We claim:

1. A modular faceplate comprising:

a faceplate frame including a pair of opposed spaced apart parallel elongated side portions and a pair of opposed spaced apart parallel elongated end portions extending between the elongated side portions in a direction normal thereto, each of the elongated side and end portions having a front, back, and inner surfaces, the front and inner surfaces of each of the respective elongated portions intersecting normal to each other, each of the inner surfaces extending from the intersection with its respective front surface in a direction toward the back surface of the faceplate, each of the end regions of one of the elongated end portions being joined to an end region of one of the elongated side portions, each of the end regions of the other of the elongated end portions being joined to the opposite end region of one of the elongated side portions, the inner surfaces of the elongated side and end portions defining a rectangular opening therebetween, the faceplate frame further including a mounting rail on each of the inner surfaces of the elongated side portions intermediate the front and back surfaces, each of the mounting rails having a front surface facing the front of the faceplate and a back surface facing the back of the faceplate and being shaped to include a spaced apart pair of notches therethrough providing access to the back surface of its respective mounting rail;

a mounting insert removably mounted on the faceplate frame in the rectangular opening, the insert including a rectangular plate extending across the width of the rectangular opening, the plate having an opening therethrough for accepting a media connector and having a front surface in coplanar relationship with the front surfaces of the elongated side and end portions, the mounting insert further including a leg at each of the corner regions of the plate, and a spacer wall at each end of the plate between the legs, each of such spacer walls having its outer surface flush with the end edge surface of the plate and extending away from the plate in a direction normal thereto to terminate in sliding engagement with the front surface of its associated mounting rail, each of the legs located on the underside of the plate with its outwardly facing surface in the same plane as the rear side of its associated spacer wall and including a ledge surface at its free end region extending from its outwardly facing surface to be in sliding engagement with the back surface of its associated mounting rail, the pair of notches in the mounting rails being spaced apart the same distance as the distance between the pair of legs at each end of the plate and the ledge surfaces of the legs being dimensioned to allow movement of the ledge surfaces through the notches and into sliding engagement with the back surface of the rails during mounting of the plate on the faceplate frame;

a stop surface on the faceplate frame in abutting relationship with one lengthwise edge of the plate, each of the legs of the plate being in adjacent relationship to its respective notch and its ledge surface and the spacer wall being in sliding engagement with the front and back rail surfaces respectfully; and a bezel stop removably mounted on the faceplate, the bezel stop being located in abutting relationship with the other lengthwise edge of the plate to keep the insert in fixed position on the faceplate frame.

* * * * *